US010048809B2

(12) United States Patent
Zhan et al.

(10) Patent No.: US 10,048,809 B2
(45) Date of Patent: Aug. 14, 2018

(54) PROJECTOR SCREEN, TOUCH SCREEN PROJECTION DISPLAYING METHOD AND SYSTEM

(71) Applicants: BOE TECHNOLOGY GROUP CO., LTD., Beijing (CN); HEFEI XINSHENG OPTOELECTRONICS TECHNOLOGY CO., LTD., Hefei (CN)

(72) Inventors: Yifei Zhan, Beijing (CN); Dayu Zhang, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

(*) Notice: Subject to any disclaimer, the term of this patent is extended or adjusted under 35 U.S.C. 154(b) by 9 days.

(21) Appl. No.: 15/306,918

(22) PCT Filed: Feb. 1, 2016

(86) PCT No.: PCT/CN2016/073059
§ 371 (c)(1),
(2) Date: Oct. 26, 2016

(87) PCT Pub. No.: WO2017/041425
PCT Pub. Date: Mar. 16, 2017

(65) Prior Publication Data
US 2017/0269788 A1    Sep. 21, 2017

(30) Foreign Application Priority Data

Sep. 8, 2015  (CN) .......................... 2015 1 0568197

(51) Int. Cl.
*G06F 3/045*  (2006.01)
*G06F 3/042*  (2006.01)
(Continued)

(52) U.S. Cl.
CPC ........... *G06F 3/0425* (2013.01); *G03B 21/56* (2013.01); *G06F 3/044* (2013.01); *G06F 3/0416* (2013.01); *G06F 3/0428* (2013.01)

(58) Field of Classification Search
USPC ......................................... 345/174
See application file for complete search history.

(56) References Cited

U.S. PATENT DOCUMENTS 8,542,214 B2  9/2013  Nakai et al.
2008/0180385 A1*  7/2008  Yoshida .................. G09G 3/20
345/102
(Continued)

FOREIGN PATENT DOCUMENTS

CN  103123560 A  5/2013
CN  103699281 A  4/2014
(Continued)

OTHER PUBLICATIONS

Written Opinion of the International Searching Authority from PCT Application No. PCT/CN2016/073059, dated Jun. 15, 2016 (5 pages).
(Continued)

*Primary Examiner* — Srilakshmi K Kumar
*Assistant Examiner* — Chineyere Wills-Burns
(74) *Attorney, Agent, or Firm* — Harness, Dickey & Pierce, P.L.C.

(57) ABSTRACT

Disclosed in the invention are a projector screen, touch screen projection displaying method and system, which belong to the field of display technology. The touch screen projection displaying system comprises a projector screen, a processing module and a projector, wherein the projector screen is provided with a capacitive touch film layer, is connected with the processing module, and is configured to receive a touch operation via the capacitive touch film layer,
(Continued)

and transmit the touch position information generated by the touch operation to the processing module; the processing module is connected with the projector, and is configured to determine the target image information according to the touch position information; and the projector is configured to receive the target image information transmitted by the processing module, process the target image information, and project the processed target image information onto the projector screen. The invention is used for projection displaying, and solves the problem of poor touch effect of touch screen projection displaying systems in the prior art, thus improving the touch effect.

20 Claims, 8 Drawing Sheets

(51) Int. Cl.
    *G06F 3/044*     (2006.01)
    *G06F 3/041*     (2006.01)
    *G03B 21/56*     (2006.01)

(56) References Cited

U.S. PATENT DOCUMENTS

| | | | | |
|---|---|---|---|---|
| 2008/0258996 | A1* | 10/2008 | Takayama | G02B 26/105 345/1.3 |
| 2011/0096394 | A1* | 4/2011 | Liu | G03B 21/62 359/457 |
| 2011/0181553 | A1* | 7/2011 | Brown | G06F 3/0425 345/175 |
| 2011/0187675 | A1* | 8/2011 | Nakai | G06F 3/044 345/174 |
| 2013/0050145 | A1* | 2/2013 | Robinson | G06F 3/0425 345/174 |
| 2014/0247209 | A1* | 9/2014 | Shimura | G06F 3/0488 345/156 |
| 2016/0216789 | A1* | 7/2016 | Chang | G06F 3/041 |

FOREIGN PATENT DOCUMENTS

| | | |
|---|---|---|
| CN | 203930313 U | 11/2014 |
| CN | 203930762 U | 11/2014 |
| CN | 101047290 B1 | 2/2015 |
| CN | 104349097 A | 2/2015 |
| CN | 104486604 A | 4/2015 |
| CN | 104516184 A | 4/2015 |
| CN | 105549798 A | 5/2016 |
| JP | 2015088000 A | 5/2015 |

OTHER PUBLICATIONS

Office Action from corresponding Chinese Application No. 201510568197.3, dated Aug. 15, 2016 (6 pages).

* cited by examiner

PROJECTOR SCREEN, TOUCH SCREEN PROJECTION DISPLAYING METHOD AND SYSTEM

FIELD

Embodiments of the invention relate to the field of display technology, in particular to a projector screen, touch screen projection displaying method and system.

BACKGROUND

A projection display system is a system which can project an image or a video onto a projector screen, and can be connected with a computer, a video compact disc (VCD), a digital versatile disc (DVD), a Blu-ray disc (BD), a game console, a digital video (DV) and the like via various interfaces to play corresponding video signals. With the rapid development of display technology, the touch screen projection displaying system has become a research hotspot of great concern. The touch screen projection displaying system can switch pictures without a control terminal, and is widely used in the fields of multimedia education, cartoons and games, traffic and transportation, finance, news media, governmental conferences and the like.

In the prior art there is a touch screen projection displaying system, which comprises a rear projection screen, an infrared touch frame, a projector set and a control device, wherein the rear projection screen comprises a projector screen and a light sensitive assembly disposed at the projector screen, the light sensitive assembly detects the luminance of the projector screen, and generates a corresponding sensed signal; the infrared touch frame senses a touch action, and generates a corresponding electrical signal; the projector set projects a plurality of images onto the projector screen, and enables the edges of adjacent images to be coincident; the control device acquires the coincident areas of the images on the projector screen according to the sensed signal, controls the projector set to homogenize the luminance at various points of the projector screen according to the coincident areas, and merges the plurality of images into a gapless integral picture, and in the meantime acquires the touch coordinates of the electrical signal generation position according to the electrical signal, and controls the projector set to switch pictures according to the touch coordinates.

The above touch screen projection displaying system adopts infrared touch, which has the problems of a small number of touch points, generally not greater than 10 points, and of a low touch sensing precision, thus having poor touch effect.

SUMMARY

In order to solve the problem of poor touch effect of the existing touch screen projection displaying system, the present invention provides a projector screen, method and touch screen projection displaying system. The technical solutions are as follows:

In a first aspect, there is provided a projector screen, which is provided with a capacitive touch film layer.

The projector screen is configured to receive a touch operation via the capacitive touch film layer, and transmit the touch position information generated by the touch operation to a processing module.

Optionally, a light emitting unit capable of generating a light signal is disposed on an edge a touch area of the projector screen, wherein the touch area is configured to receive the touch operation.

Optionally, the light emitting unit is a light emitting diode (LED).

In a second aspect, there is provided a touch screen projection displaying system, comprising a projector screen, a processing module and a projector, wherein, the projector screen is provided with a capacitive touch film layer, is connected with the processing module, and is configured to receive a touch operation via the capacitive touch film layer, and transmit the touch position information generated by the touch operation to the processing module;

the processing module is connected with the projector, and is configured to determine target image information according to the touch position information:

the projector is configured to receive the target image information transmitted by the processing module, process the target image information, and project the processed target image information onto the projector screen.

Optionally, a light emitting unit is disposed on an edge of a touch area of the projector screen; the projector screen is configured to receive the touch operation via the touch area, and transmit the touch position information generated by the touch operation to the processing module; the projector is further configured to:

determine a boundary of the touch area according to the light signal generated by the light emitting unit;

determine a boundary of a display area according to the luminance of the image information currently displayed on the projector screen, wherein the display area is configured to display the processed target image information;

transmit first area information and second area information to the processing module, such that the processing module can determine the target image information according to the first area information, the second area information and the touch position information, wherein the first area information is the boundary information of the touch area, and the second area information is the boundary information of the display area.

Optionally, the projector comprises a video input unit, a microcontroller unit (MCU) and an image display unit, wherein the MCU is connected with the video input unit, the image display unit and the processing unit respectively;

the video input unit is configured to:
acquire the light signal,
determine the boundary of the touch area according to the light signal,
take the boundary information of the touch area as the first area information,
acquire the luminance of the image information currently displayed on the projector screen,
determine the boundary of the display area according to the luminance of the image information currently displayed on the projector screen,
take the boundary information of the display area as the second area information, and
transmit the first area information and the second area information to the MCU;
the MCU is configured to:
transmit the first area information and the second area information to the processing module,
receive the target image information transmitted by the processing module,
process the target image information to obtain information that can be received by the image display unit, and
transmit the processed target image information to the image display unit:

the image display unit is configured to:
project the processed target image information onto the projector screen.

Optionally, the video input unit is a camera.

Optionally, the target image information is an image or a video pre-stored in the processing module.

In a third aspect, there is provided a touch screen projection displaying method, comprising:
receiving by a projector screen a touch operation via a capacitive touch film layer;
transmitting by the projector screen the touch position information generated by the touch operation to a processing module;
determining by the processing module target image information according to the touch position information:
receiving by the projector the target image information transmitted by the processing module;
processing by the projector the target image information; and
projecting by the projector the processed target image information onto the projector screen.

Optionally, a light emitting unit is disposed on an edge of a touch area of the projector screen; and before determining by the processing module target image information according to the touch position information, the method further comprises:
determining by the projector a boundary of the touch area according to a light signal generated by the light emitting unit, wherein the projector screen is configured to receive the touch operation via the touch area, and transmit the touch position information generated by the touch operation to the processing module;
determining by the projector a boundary of a display area according to the luminance of the image information currently displayed on the projector screen, wherein the display area is configured to display the processed target image information;
transmitting by the projector first area information and second area information to the processing module, such that the processing module can determine the target image information according to the first area information, the second area information and the touch position information, wherein the first area information is the boundary information of the touch area, and the second area information is the boundary information of the display area.

Optionally, the projector comprises a video input unit, a microcontroller unit (MCU) and an image display unit;
the determining by the projector a boundary of the touch area according to a light signal generated by the light emitting unit comprises:
acquiring the light signal by the video input unit; and
determining by the video input unit the boundary of the touch area according to the light signal;
the determining by the projector a boundary of a display area according to the luminance of the image information currently displayed on the projector screen comprises:
acquiring by the video input unit the luminance of the image information currently displayed on the projector screen; and
determining by the video input unit the boundary of the display area according to the luminance of the image information currently displayed on the projector screen;
the transmitting by the projector the first area information and the second area information to the processing module comprises:

taking by the video input unit the boundary information of the touch area as the first area information;
taking by the video input unit the boundary information of the display area as the second area information;
transmitting by the video input unit the first area information and the second area information to the MCU; and
transmitting by the MCU the first area information and the second area information to the processing module:
the receiving by the projector the target image information transmitted by the processing module comprises:
receiving by the MCU the target image information transmitted by the processing module;
the processing by the projector the target image information comprises:
processing by the MCU the target image information to obtain information that can be received by the image display unit:
the projecting by the projector the processed target image information onto the projector screen comprises:
transmitting by the MCU the processed target image information to the image display unit; and
projecting by the image display unit the processed target image information onto the projector screen.

Optionally, the light emitting unit is a light emitting diode (LED).

Optionally, the video input unit is a camera.

Optionally, the target image information is an image or a video pre-stored in the processing module.

The invention provides a projector screen, touch screen projection displaying method and system. The projector screen of the touch screen projection displaying system first receives an touch operation via a capacitive touch film layer, and then transmits touch position information generated by the touch operation to a processing module; the processing module determines target image information according to the touch position information; then the projector receives the target image information transmitted by the processing module, and projects the processed target image information onto the projector screen. Compared to the prior art, no infrared touch needs to be used, thus improving touch efficiency.

It should be appreciated that the general description above and the detailed description hereinafter are merely intended to illustrate and explain but not to limit the invention.

BRIEF DESCRIPTION OF DRAWINGS

In order to clearly describe technical solutions in embodiments of the invention, the drawings needed in description of embodiments will be briefly introduced hereinafter. Obviously, the drawings in the description hereinafter only represent some embodiments of invention. Those ordinarily skilled in the art can acquire other drawings based on these drawings without involving inventive effort.

FIG. 7-1 is a flow chart of another touch screen projection displaying method provided by an embodiment of the invention;

FIG. 7-2 is a flow chart for determining a boundary of a touch area provided by an embodiment of the invention;

FIG. 7-3 is a flow chart for determining a boundary of a display area provided by an embodiment of the invention;

FIG. 7-4 is a flow chart for transmitting area information to a processing module provided by an embodiment of the invention;

FIG. 7-5 is a schematic diagram of displaying target image information provided by an embodiment of the invention;

The above drawings have explicitly depicted embodiments of the invention, which will be described in detail hereinafter. The drawings and textual description are intended to explain the concept of the invention for those skilled in the art with reference to specific embodiments, but not to limit the conceptive scope of the invention in any way.

DETAILED DESCRIPTION OF EMBODIMENTS

In order to make the objectives, technical solutions and advantages of the invention clearer, embodiments of the invention will be further described in detail hereinafter with reference to the drawings.

Figure 1:
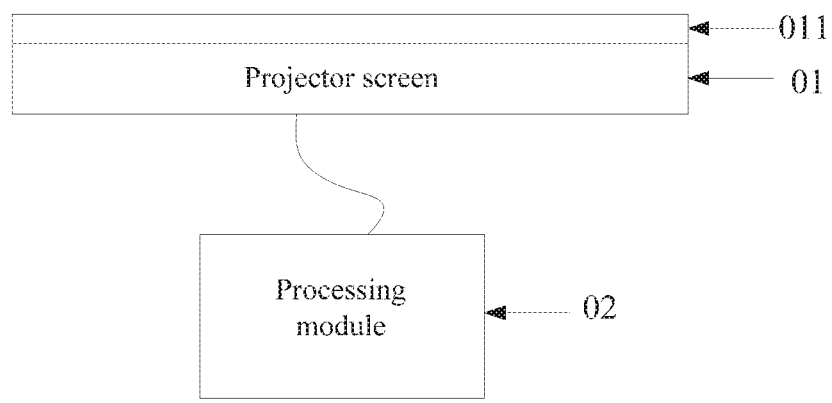
FIG. 1 is a structural schematic diagram of a projector screen provided by an embodiment of the invention.

An embodiment of the invention provides a projector screen. As shown in FIG. 1, the projector screen 01 is provided with a capacitive touch film layer 011. The projector screen 01 is configured to receive a touch operation via the capacitive touch film layer 011, and transmit touch position information generated by the touch operation to a processing module 02.

Figure 2:
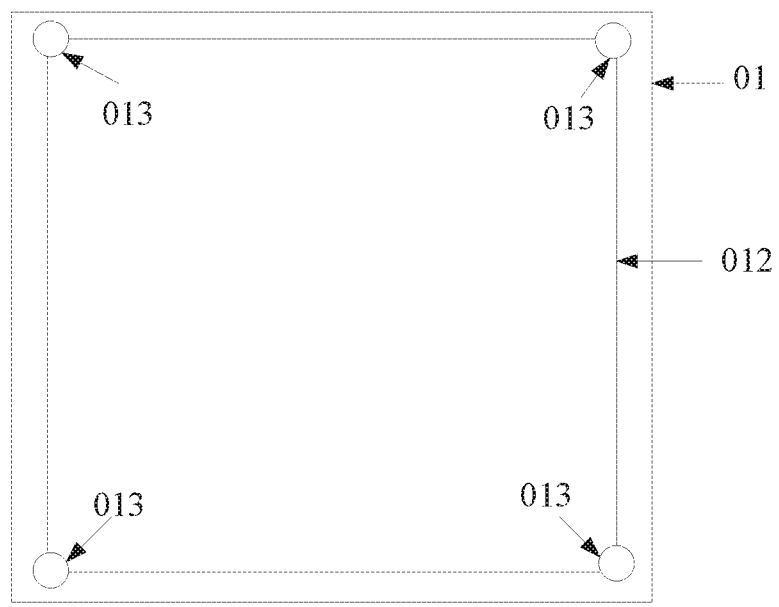
FIG. 2 is a structural schematic diagram of a touch area of a projector screen provided by an embodiment of the invention.

As shown in FIG. 2, a light emitting unit 013 capable of generating a light signal is disposed on an edge of a touch area 012 of the projector screen 01, wherein the touch area 012 is configured to receive a touch operation. Optionally, the light emitting unit 013 is a light emitting diode (LED).

In summary, the projector screen provided by an embodiment of the invention can receive a touch operation via the capacitive touch film layer, and transmit the touch position information generated by the touch operation to the processing module. Compared to the prior art, no infrared touch needs to be used, thus improving touch efficiency.

Figure 3:
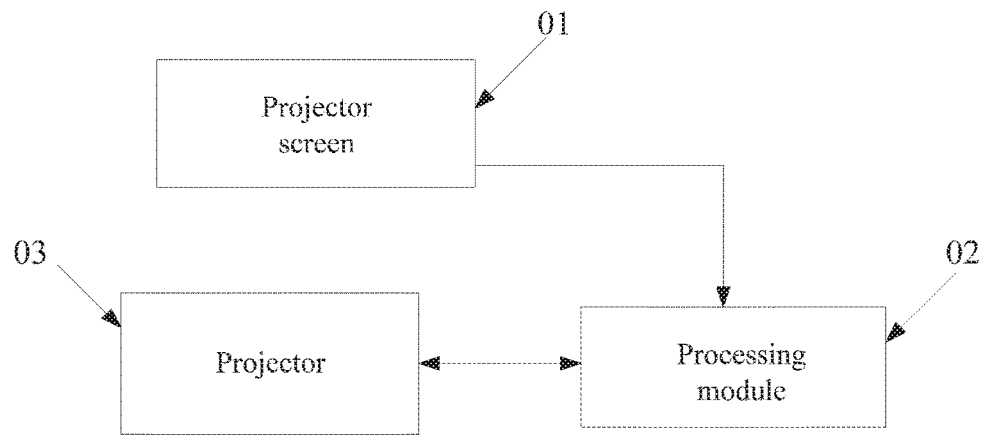
FIG. 3 is a structural schematic diagram of a touch screen projection displaying system provided by an embodiment of the invention.

An embodiment of the invention provides a touch screen projection displaying system. As shown in FIG. 3, the touch screen projection displaying system may comprise a projector screen 01, a processing module 02 and a projector 03, wherein the projector screen 01 is as shown in FIG. 1.

Therein the projector screen 01 is provided with a capacitive touch film layer, is connected with the processing module 02, and is configured to receive a touch operation via the capacitive touch film layer, and transmit the touch position information generated by the touch operation to the processing module 02.

The processing module 02 is connected with the projector 03, and is configured to determine target image information according to the touch position information.

It should be further noted that a capacitive touch film layer utilizes current induction of a human body to operate; when a user touches the capacitive touch film layer with a finger or a stylus, the finger or the stylus and the capacitive touch film layer forms a coupling capacitor due to the electric field of the human body; since the capacitive touch film layer is connected with a high frequency signal, a given quantity of electric charges will be transferred to the finger or the stylus, and to compensate the loss of these electric charges, electric charges will be supplemented from the four corners of the capacitive touch film layer; the quantity of the supplemented electric charges is in proportion to the distances from the touch point to the four corners. Therefore, the position of the touch point can be calculated, and is taken as the touch position information.

The projector 03 is configured to receive the target image information transmitted by the processing module 02, process the target image information, and project the processed target image information onto the projector screen 01.

In summary, an embodiment of the invention provides a touch screen projection displaying system. The projector screen of the touch screen projection displaying system can receive a touch operation via the capacitive touch film layer, and transmit the touch position information generated by the touch operation to the processing module; the processing module can determine target image information according to the touch position information; the projector can receive the target image information transmitted by the processing module, and project the processed target image information onto the projector screen. Compared to the prior art, no infrared touch needs to be used, thus improving the touch effect.

Optionally, as shown in FIG. 2, a light emitting unit 013 is disposed on an edge of a touch area 012 of the projector screen 01; the projector screen 01 is configured to receive the touch operation via the touch area 012, and transmit the touch position information generated by the touch operation to the processing module.

Figure 4:
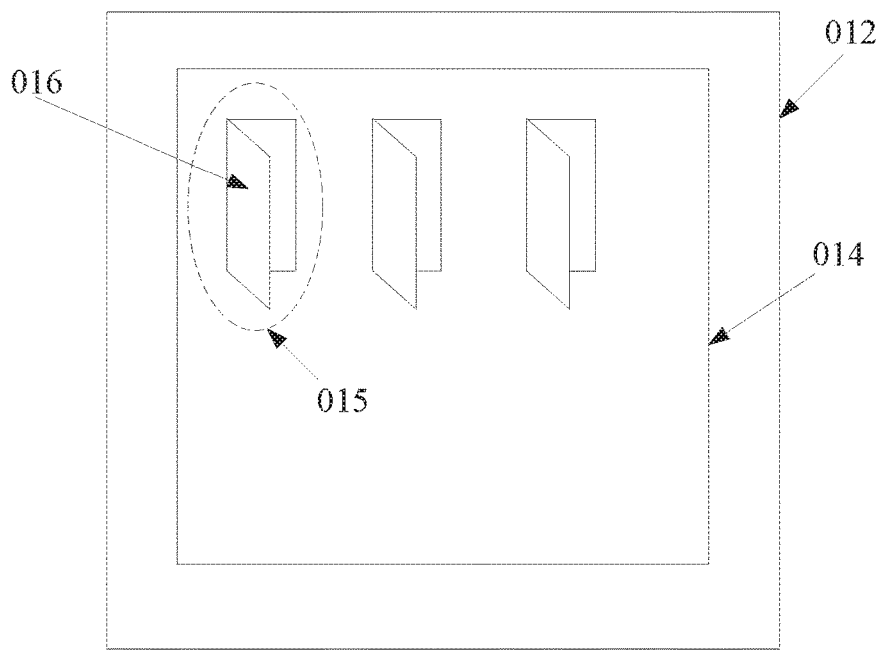
FIG. 4 is a structural schematic diagram of a touch area and a display area provided by an embodiment of the invention.

Accordingly, the projector 03 is further configured to: determine a boundary of the touch area according to the light signal generated by the light emitting unit (since the light emitting unit is disposed on the edge of the touch area of the projector screen, the boundary of the touch area can be determined according to the light signal generated by the light emitting unit); determine a boundary of a display area according to the luminance of the image information currently displayed on the projector screen, wherein the display area is configured to display the processed target image information; transmit first area information and second area information to the processing module, such that the processing module can determine the target image information according to the first area information, the second area information and the touch position information, wherein the first area information is the boundary information of the touch area, and the second area information is the boundary information of the display area. FIG. 4 depicts a structural schematic diagram of the touch area 012 and the display area 014. In practical application, in the case that the area of the touch area equals to the area of the display area, when an edge of the target image displayed in the display area is touched, the touch area at the corresponding position may not receive the touch operation accurately. Therefore, in order to enable the touch area to accurately receive a touch operation, the area of the touch area 012 is required to be greater than the area of the display area 014. In FIG. 4, 015 is a position corresponding to a touch operation, and 016 is a file folder 1. It should be noted that the contents in the display area in FIG. 4 are part of the contents actually displayed, and the other contents such as a path indication part are not shown.

Figure 5:
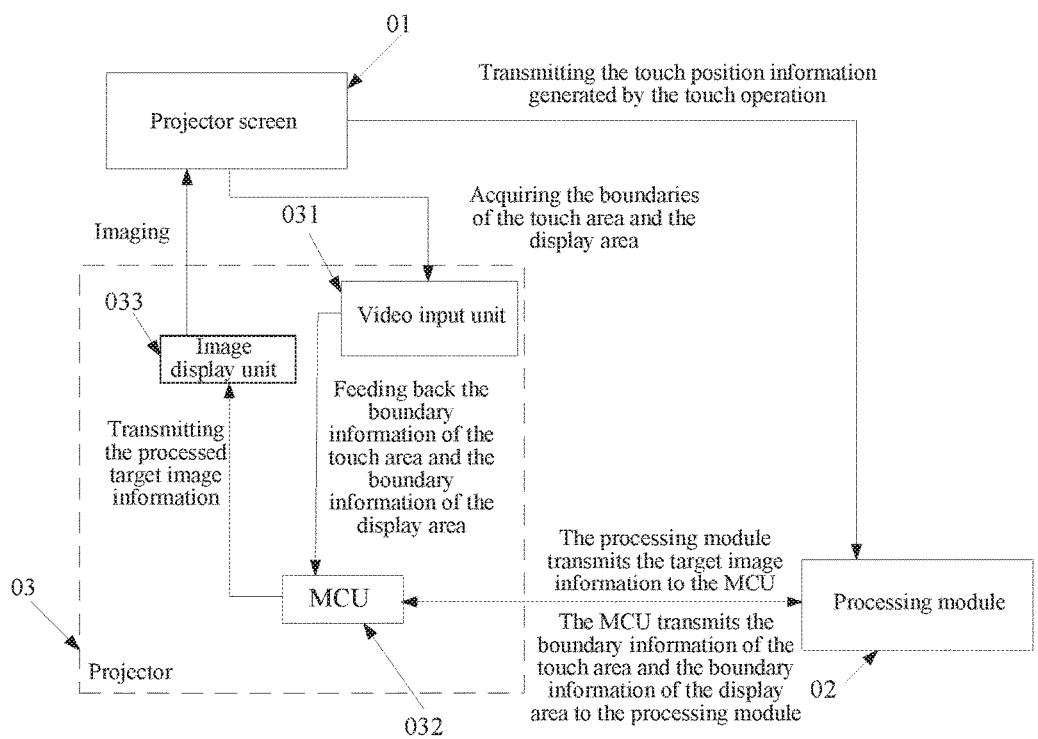
FIG. 5 is a structural schematic diagram of a projector provided by the embodiment of an invention.

Further, as shown in FIG. 5, the projector 03 comprises a video input unit 031, a microcontroller unit (MCU) 032 and an image display unit 033, wherein the MCU 032 is connected with the video input unit 031, the image display unit 033 and the processing unit 02 respectively.

Therein the video input unit is configured to: acquire a light signal; determine the boundary of the touch area according to the light signal, and acquire the boundary of the touch area; take the boundary information of the touch area as the first area information; acquire the luminance of the image information currently displayed on the projector screen 01; determine the boundary of the display area according to the luminance of the image information currently displayed on the projector screen 01, and acquire the boundary of the display area take the boundary information of the display area as the second area information; and transmit the first area information and the second area information to the MCU 032, such that the MCU 032 can transmit the first area information and the second area information to the processing module 02. The video input unit 031 feeds back the boundary information of the touch area and the boundary information of the display area to the MCU 032; then the MCU 032 transmits the boundary information of the touch area and the boundary information of the display area to the processing module 02. It should be noted that the video input unit is independent of a high definition multimedia interface (HDMI) or a video graphics array (VGA) in the projection display system, and the video input unit is configured to determine the boundaries of the touch area and the display areas. For example, the video input unit may be a camera.

The MCU 032 is configured to:

1) Transmit the first area information and the second area information to the processing module.

The MCU 032 transmits the first area information and the second area information to the processing module 02, such that the processing module 02 can calculate and determine the target image information according to the boundary information of the touch area, namely the first area information, the boundary information of the display area, namely the second area information, and the touch position information. Specifically, first it may be determined whether the touch position is in the display area; if the touch position is not in the display area, then the target image information calculated by the processing module is null; and if the touch position is in the display area, then the processing module determines the image information corresponding to the touch position generated by the touch operation, namely the target image information, according to the corresponding relationships between stored touch positions and image information. The corresponding relationship between the touch position and image information may be acquired according to the boundary information of the touch area and the boundary information of the display area. For the acquisition process, reference may be made to the prior art.

Table 1 depicts the relationships between three touch positions in the touch area and the image information corresponding to the three touch positions. As shown in table 1, when the touch position generated by a touch operation is position A, the projector screen transmits the position A to the processing module, and the processing module queries table 1 to acquire the image information A1 corresponding to the position A. Therefore, the processing module takes the image information A1 as the target image information.

Table 1

| Touch position | Image information |
|---|---|
| Position A | Image information A1 |
| Position B | Image information B1 |
| Position C | Image information C1 |

2) Receive the target image information transmitted by the processing module 02.

3) Process the target image information to obtain information that can be received by the image display unit 033.

The processed target image information can be received by the image display unit. The MCU, as an image or video processing device, is widely used in projection display systems, and can be used to process images, data, videos and the like to determine the format, quality, display manner and the like of an image.

4) Transmit the processed target image information to the image display unit 033.

For example, the target image information may be an image or a video pre-stored in the processing module 02.

The image display unit 033 is configured to project the target image information having been processed by the MCU 032 onto the projector screen 01. The image display unit 033 projects the target image information having been processed by the MCU 032 onto the projector screen 01, thus completing the imaging process.

It should be further noted that the touch screen projection displaying system in an embodiment of the invention may be implemented only by adding a capacitive touch film layer to an existing projector screen, and adding a video input unit to an existing projector, thus having a low cost. Furthermore, the touch screen projection displaying system utilizes a projector to realize touch control, forming a capacitive touch control system for a projector, thus facilitating the touch technology's extension to super-large screens. Therefore, the touch screen projection displaying system has a broader applicability.

In summary, embodiments of the invention provide a touch screen projection displaying system. The projector screen of the touch screen projection displaying system may receive a touch operation via a capacitive touch film layer, and transmit the touch position information generated by the touch operation to a processing module; the processing module may determine the target image information according to the touch position information; the projector may receive the target image information transmitted by the processing module, and project the processed target image information onto the projector screen. Compared to the prior art, no infrared touch needs to be used, thus improving the touch effect.

Figure 6:
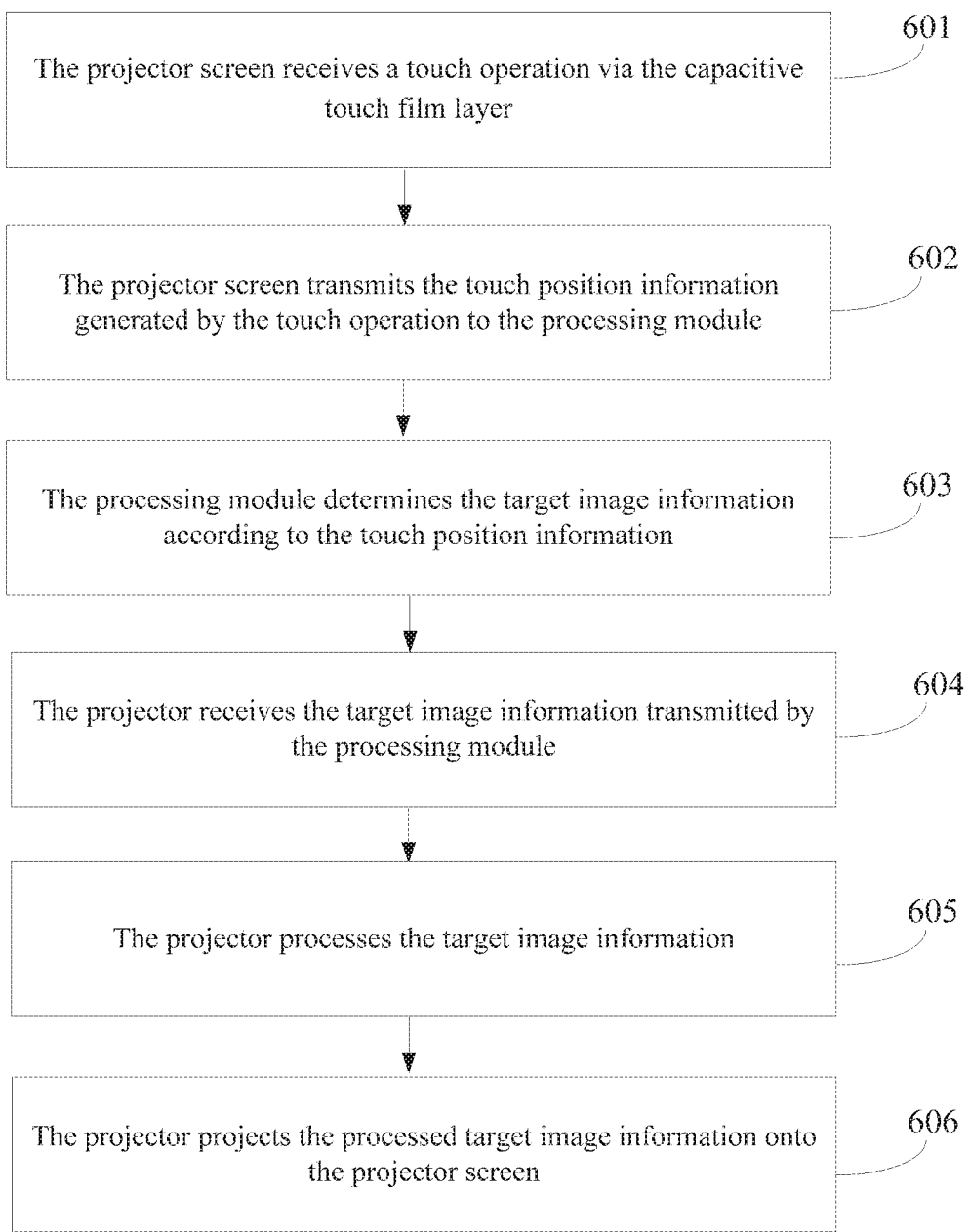
FIG. 6 is a flow chart of a touch screen projection displaying method provided by an embodiment of the invention.

An embodiment of the invention provides a touch screen projection displaying method. As shown in FIG. 6, the method comprises:

Step 601, a projector screen receives a touch operation via a capacitive touch film layer;

Step 602, the projector screen transmits the touch position information generated by the touch operation to a processing module;

Step 603, the processing module determines target image information according to the touch position information;

Step 604, the projector receives the target image information transmitted by the processing module;

Step 605, the projector processes the target image information;

Step 606, the projector projects the processed target image information onto the projector screen.

In summary, an embodiment of the invention provides a touch screen projection displaying method. The projector screen may receive a touch operation via a capacitive touch film layer, and transmit the touch position information generated by the touch operation to a processing module; the processing module may determine target image information according to the touch position information; the projector may receive the target image information transmitted by the processing module, and project the processed target image information onto the projector screen. Compared to the prior art, no infrared touch needs to be used, thus improving the touch effect.

Optionally, a light emitting unit is disposed on an edge of a touch area of the projector screen; and before the step 603, the method further comprises:

The projector determines the boundary of the touch area according to the light signal generated by the light emitting unit; the projector screen is configured to receive the touch operation via the touch area, and transmit the touch position information generated by the touch operation to the processing module; the projector determines the boundary of display area according to the luminance of the image information currently displayed on the projector screen, wherein the display area is configured to display the processed target image information; the projector transmits first area information and second area information to the processing module, such that the processing module may determine target image information according to the first area information, the second area information and the touch position information, wherein the first area information is the boundary information of the touch area, and the second area information is the boundary information of the display area.

Optionally, the projector comprises a video input unit, an MCU and an image display unit.

Correspondingly, that the projector determines the boundary of the touch area according to the light signal generated by the light emitting unit, comprises: the video input unit acquires a light signal; and the video input unit determines the boundary of the touch area according to the light signal.

That the projector determines the boundary of the display area according to the luminance of the image information currently displayed on the projector screen, comprises: the video input unit acquires the luminance of the image information currently displayed on the projector screen; and the video input unit determines the boundary of the display area according to the luminance of the image information currently displayed on the projector screen.

That the projector transmits the first area information and the second area information to the processing module, comprises: the video input unit takes the boundary information of the touch area as the first area information; the video input unit takes the boundary information of the display area as the second area information; the video input unit transmits the first area information and the second area information to the MCU; and the MCU transmits the first area information and the second area information to the processing module.

The step 604 specifically comprises: the MCU receives the target image information transmitted by the processing module.

The step 605 specifically comprises: the MCU processes the target image information to obtain information that can be received by the image display unit.

The step 606 specifically comprises: the MCU transmits the processed target image information to the image display unit; and the image display unit projects the processed target image information onto the projector screen.

Optionally, the light emitting unit is an LED; the video input unit is a camera; and the target image information is an image or a video.

In summary, embodiments of the invention provide a touch screen projection displaying method. The projector screen may receive a touch operation via a capacitive touch film layer, and transmit the touch position information generated by the touch operation to a processing module; the processing module may determine the target image information according to the touch position information; the projector may receive the target image information transmitted by the processing module, and project the processed target image information onto the projector screen. Compared to the prior art, no infrared touch needs to be used, thus improving the touch effect.

Figures 1, 7:
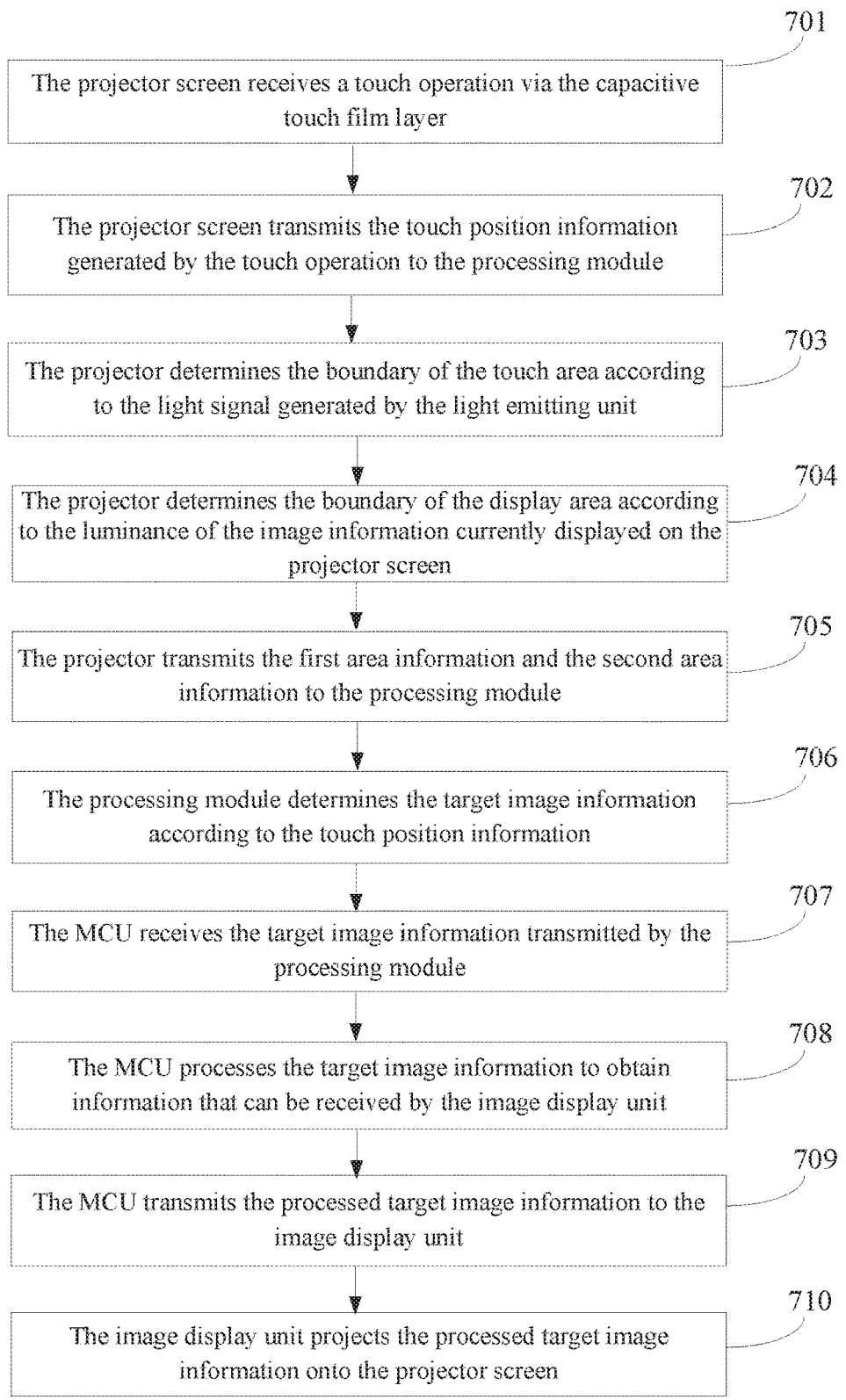
Figures 2, 7:
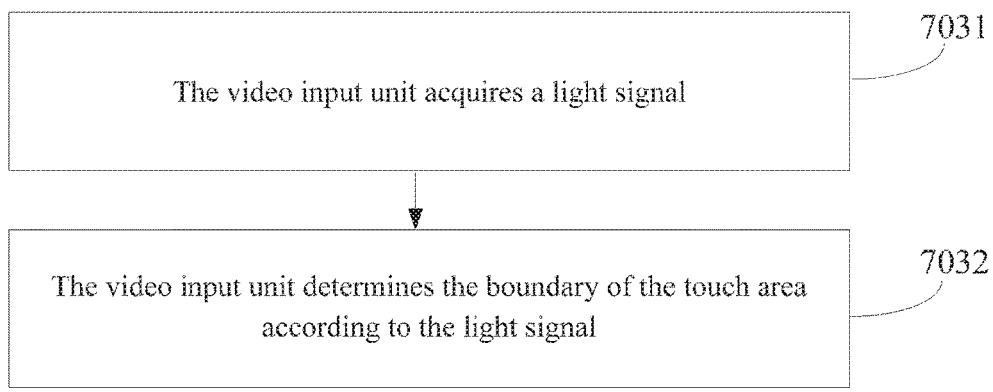
Figures 3, 7:
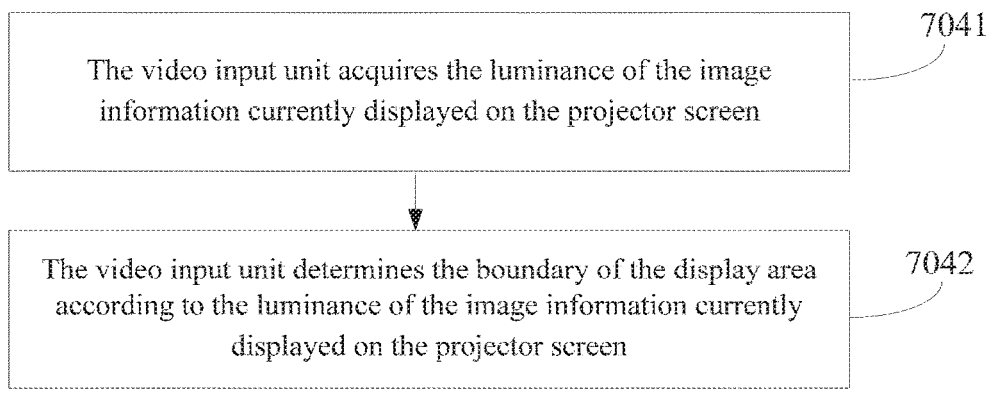
Figures 4, 7:
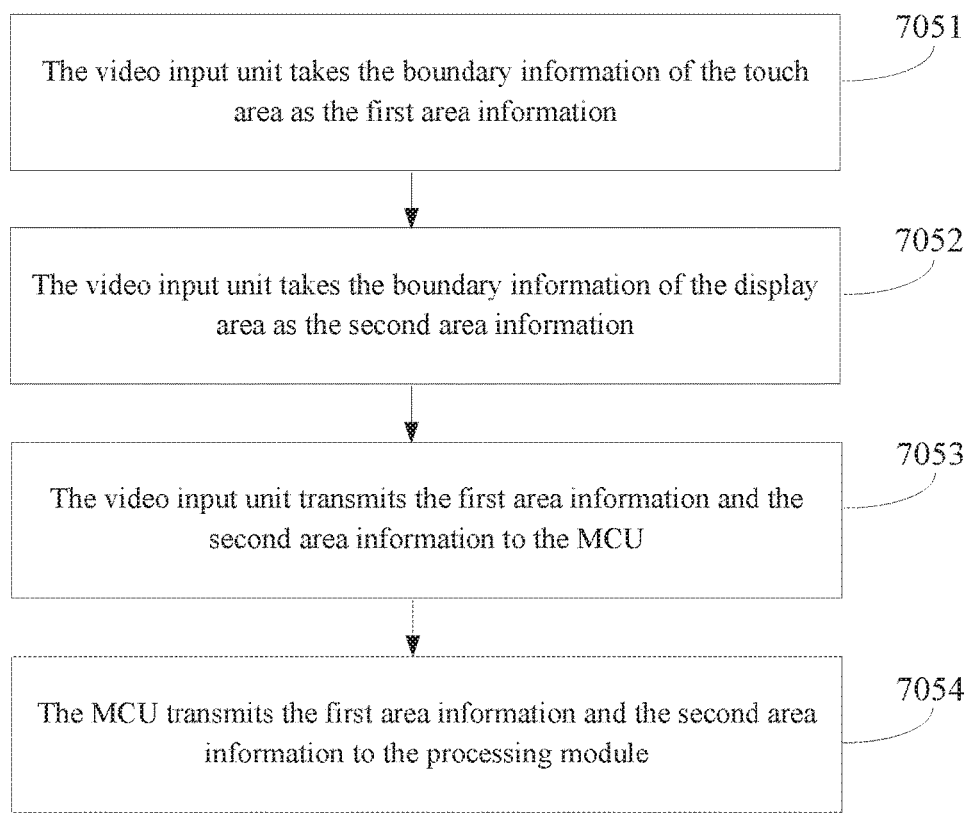
Figures 5, 7:
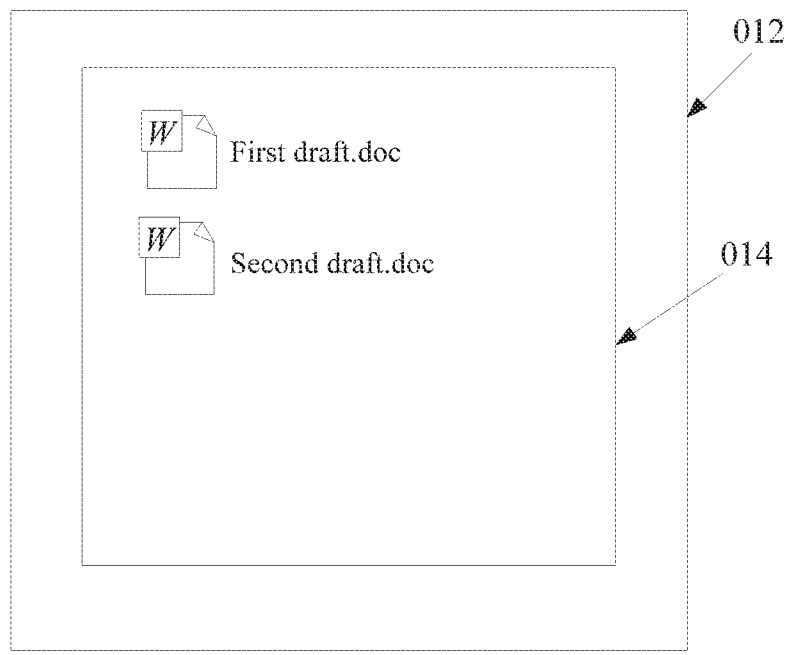

An embodiment of the invention provides another touch screen projection displaying method. As shown in FIG. 7-1, the method may comprise:

Step 701, the projector screen receives a touch operation via a capacitive touch film layer.

The projector screen is provided with a capacitive touch film layer. When a user touches the capacitive touch film layer with a finger or other touch devices such as a stylus, the projector screen receives the touch operation via the capacitive touch film layer. The use of capacitive touch causes more touch points, higher touch sensing precision and higher projection display quality.

Step 702, the projector screen transmits the touch position information generated by the touch operation to a processing module.

A light emitting unit is disposed on an edge of a touch area of the projector screen, wherein the touch area is configured to receive a touch operation. For example, the processing module may be any device having calculation and processing capacities such as a computer; the light emitting unit may be disposed at the four corners on the edge of the touch area, and may be an LED; LED is one kind of semiconductor diodes, and can convert an electrical signal into a light signal. It should be noted that any unit capable of converting an electrical signal into a light signal can be used as the light emitting unit, and embodiments of the invention have no limitation in this respect.

For a specific process that the capacitive touch film layer receives a touch operation and acquires the touch position information, reference may be made to the prior art, and detailed description thereof will be omitted in embodiments of the invention.

Step 703, the projector determines the boundary of the touch area according to the light signal generated by the light emitting unit.

Since the light emitting unit such as an LED is disposed on the edge of the touch area of the projector screen, the projector can determine the boundary of the touch area according to the light signal generated by the LED.

Optionally, as shown in FIG. 5, the projector comprises a video input unit 031, an MCU 032 and an image display unit 033, wherein the MCU 032 is connected with the video input unit 031, the image display unit 033 and the processing unit 02 respectively. Correspondingly, as shown in FIG. 7-2, the step 703 may comprise:

Step 7031, the video input unit acquires a light signal.

For example, the video input unit may be a camera, in which case the light signal generated by the light emitting unit such as an LED may be acquired via the camera.

Step 7032, the video input unit determines the boundary of the touch area according to the light signal.

For example, the camera may determine the boundary of the touch area according to the light signal generated by the LED.

Step 704, the projector determines the boundary of the display area according to the luminance of the image information currently displayed on the projector screen.

The display area is configured to display processed target image information, and the target image information may the target image information determined in step 706. When displayed in the display area, images will generate different luminances; for example, an image with a brilliant color will generate a high luminance, an image with a less brilliant color will generate a lower luminance, and the area beyond the display area does not display image information, and thus cannot generate luminance of image information. Therefore, the projector can determine the boundary of the display area according to the different luminances generated by the image information currently displayed on the projector screen.

As shown in FIG. 7-3, the step 704 comprises:

Step 7041, the video input unit acquires the luminance of the image information currently displayed on the projector screen.

For example, the luminance of the image information currently displayed on the projector screen may be acquired via a camera.

Step 7042, the video input unit determines the boundary of the display area according to the luminance of the image information currently displayed on the projector screen.

For example, the boundary of the display area may be determined via a camera according to the acquired luminance of the image information currently displayed on the projector screen.

Embodiments of the invention determine the boundary of the touch area and the boundary of the display area via the video input unit, enabling the touch position and the target image information to correspond to each other, thus solving the problem in the prior art that the projector and the projector screen must be bound together, otherwise the touch position and the target image information would be hard to be aligned, improving projection display flexibility, and broadening the application scenarios of projection display.

Step 705, the projector transmits the first area information and the second area information to the processing module.

The first area information is the boundary information of the touch area, and the second area information is the boundary information of the display area. After the video input unit determines the boundary of the touch area and the boundary of the display area, the MCU in the projector may transmit the boundary information of the touch area and the boundary information of the display area to the processing module. The MCU, known as a single chip microcomputer, is a chip integrating an internal processor, a memory, a counter, and an input/output port. On the basis of the hardware circuit, the data to be processed including the first area information and the second area information, a calculation method, steps, operation commands and the like may be compiled into a program and stored in the memory; when in running, the MCU may automatically and continuously read from the memory and execute the program.

As shown in FIG. 7-4, the step 705 may comprise:

Step 7051, the video input unit takes the boundary information of the touch area as the first area information.

After the video input unit determines the boundary of the touch area according to the light signal generated by the light emitting unit, it takes the boundary information of the touch area as the first area information.

Step 7052, the video input unit takes the boundary information of the display area as the second area information.

After the video input unit determines the boundary of the display area according to the luminance of the image information currently displayed on the projector screen, it takes the boundary information of the display area as the second area information.

Step 7053, the video input unit transmits the first area information and the second area information to the MCU.

For example, the position information of the touch area and the position information of the display area may be firstly transmitted to the MCU via the camera.

Step 7054, the MCU transmits the first area information and the second area information to the processing module.

Specifically, the position information of the touch area and the position information of the display area are then transmitted to the processing module via the MCU.

Step 706, the processing module determines target image information according to the touch position information.

The processing module determines the target image information according to the boundary information of the touch area, namely the first area information, the boundary information of the display area, namely the second area information, and the touch position information. Specifically, it may be first determined whether the touch position is in the display area; if the touch position is not in the display area, then the target image information calculated by the processing module is null; and if the touch position is in the display area, then the processing module determines the image information corresponding to the touch position generated by the touch operation, namely the target image information, according to the corresponding relationship between the stored touch position and image information. The corresponding relationship between the touch position and image information may be acquired according to the boundary information of the touch area and the boundary information of the display area. Taking FIG. 4 as an example, assuming a touch operation is generated at the position 015, then the processing module may capture the user intention according to the boundary information of the touch area 012, the boundary information of the display area 014, and the touch position 015, and determine that the user wants to open the file folder 1. Therefore, the processing module may finally determine that the target image information is the image information of the opened file folder 1.

It should be noted that the target image information may be an image pre-stored in the processing module, or may be a video pre-stored in the processing module.

Step 707, the MCU receives the target image information transmitted by the processing module.

After the target image information is determined, the processing module transmits the target image information to the MCU.

Step 708, the MCU processes the target image information to obtain information that can be received by the image display unit.

The MCU processes the target image information determined by the processing module, and the processed target image information can be received by the image display unit.

Step 709, the MCU transmits the processed target image information to the image display unit.

The image display unit is a unit capable of reproducing the target image information determined by the processing module. The image display unit firstly converts the electrical signal into a light image, and then projects the light image onto the projector screen, such that the projector screen can display the final image or video.

Step 710, the image display unit projects the processed target image information onto the projector screen.

Taking the file folder 1 in the step 706 as an example, the image display unit projects the image information of the opened file folder 1 onto the projector screen, and the image finally displayed on the projector screen is as shown in the schematic diagram FIG. 7-5. The contents displayed in FIG. 7-5 are the contents in the file folder 1. In FIG. 7-5, 012 is a touch area, and 014 is a display area. It should be noted that the contents in the display area in FIG. 7-5 are part of the contents actually displayed, and the other contents such as the path indication part are not shown.

It should be noted that the touch screen projection displaying method in an embodiment of the invention may be implemented by only adding a capacitive touch film layer to an existing projector screen, and adding a video input unit to an existing projector, thus having a low cost.

It should be further noted that a touch screen is a novel human-machine interaction device, and using a touch screen to perform human-machine interaction is the simplest and most convenient and natural manner of human-machine interaction at present. The advantages of the touch screen such as ease of use, robustness, quick response, space saving and the like enable the touch screen to be used increasingly widely. At present, the touch screen is primarily combined with a liquid crystal display module for use. In the fields of education, conferencing and the like, due to the high cost of a super-large liquid crystal module, the demand in these fields is still satisfied by projectors at present. And with the rapid development of the human-machine interaction technology, to realize touch control on projection displaying is also an important development direction in the future. The method of the invention utilizes a projector to realize touch control, thus facilitating the extension of the touch control technology to super-large screens, and having better applicability.

In summary, embodiments of the invention provide a touch screen projection displaying method. The projector screen may receive a touch operation via a capacitive touch film layer, and transmit the touch position information generated by the touch operation to a processing module; the processing module may determine target image information according to the touch position information; the projector may receive the target image information transmitted by the processing module, and project the processed target image information onto the projector screen. Compared to the prior art, no infrared touch needs to be used, thus improving the touch effect.

The description above is only about exemplary embodiments of the invention, and is not to be used to limit the invention. Any amendments, equivalent substitutions, improvements and the like within the spirit and principle of the invention should all be included in the protection scope of the invention.

The invention claimed is:

1. A touch screen projection displaying system comprising a light emitting unit, a projector, a processing module connected with the projector, and a projector screen connected with the processing module, the projector screen including a capacitive touch film layer and a touch area, the projector screen configured to receive a touch operation via the touch area, and transmit touch position information generated by the touch operation to the processing module, the light emitting unit disposed on an edge of the touch area of the projector screen, the processing module configured to determine target image information according to the touch position information, the projector configured to receive the target image information transmitted by the processing module, process the target image information, project the processed target image information onto the projector screen, determine a boundary of the touch area according to a light signal generated by the light emitting unit, determine a boundary of a display area according to the luminance of the image information currently displayed on the projector screen, wherein the display area is configured to display the processed target image information, and transmit boundary information of the touch area and boundary information of the display area to the processing module to allow the processing module to determine the target image information according to the boundary information of the touch area, the boundary information of the display area and the touch position information.

2. The touch screen projection displaying system according to claim 1, wherein the projector comprises a video input unit, a microcontroller unit (MCU) and an image display unit, wherein the MCU is connected with the video input unit, the image display unit and the processing module, wherein the video input unit is configured to acquire the light signal, determine the boundary of the touch area according to the light signal, acquire the luminance of the image information currently displayed on the projector screen, determine the boundary of the display area according to the luminance of the image information currently displayed on the projector screen, and transmit the boundary information of the touch area and the boundary information of the display area to the MCU, wherein the MCU is configured to transmit the boundary information of the touch area and the boundary information of the display area to the processing module, receive the target image information transmitted by the processing module, process the target image information to obtain information receivable by the image display unit, and transmit the processed target image information to the image display unit, and wherein the image display unit is configured to project the processed target image information onto the projector screen.

3. The touch screen projection displaying system according to claim 2, wherein the video input unit is a camera.

4. The touch screen projection displaying system according to claim 3, wherein the target image information is an image or a video pre-stored in the processing module.

5. The touch screen projection displaying system according to claim 2, wherein the target image information is an image or a video pre-stored in the processing module.

6. The touch screen projection displaying system according to claim 1, wherein the target image information is an image or a video pre-stored in the processing module.

7. A touch screen projection displaying method comprising:
receiving, by a projector screen, a touch operation via a touch area;
transmitting, by the projector screen, touch position information generated by the touch operation to a processing module;
determining, by the processing module, target image information according to the touch position information;
receiving, by a projector, the target image information transmitted by the processing module;
processing, by the projector, the target image information;
projecting, by the projector, the processed target image information onto the projector screen;

wherein before determining the target image information, the method further comprises:
  determining, by the projector, a boundary of the touch area according to a light signal generated by a light emitting unit disposed on an edge of a touch area of the projector screen;
  determining, by the projector, a boundary of a display area according to the luminance of the image information currently displayed on the projector screen, wherein the display area is configured to display the processed target image information; and
  transmitting, by the projector, boundary information of the touch area and boundary information of the display area to the processing module to allow the processing module to determine the target image information according to the boundary information of the touch area, the boundary information of the display area and the touch position information.

8. The method according to claim 7, wherein the projector comprises a video input unit, a microcontroller unit (MCU) and an image display unit;
  wherein determining, by the projector, the boundary of the touch area comprises acquiring the light signal by the video input unit and determining, by the video input unit, the boundary of the touch area according to the light signal;
  wherein determining, by the projector, the boundary of the display area comprises acquiring, by the video input unit, the luminance of the image information currently displayed on the projector screen and determining, by the video input unit, the boundary of the display area according to the luminance of the image information currently displayed on the projector screen;
  wherein transmitting, by the projector, the boundary information of the touch area and the boundary information of the display area to the processing module comprises transmitting, by the video input unit, the boundary information of the touch area and the boundary information of the display area to the MCU and transmitting, by the MCU, the boundary information of the touch area and the boundary information of the display area to the processing module;
  wherein receiving, by the projector, the target image information transmitted by the processing module comprises receiving, by the MCU, the target image information transmitted by the processing module;
  wherein processing, by the projector, the target image information comprises processing, by the MCU, the target image information to obtain information receivable by the image display unit; and
  wherein projecting, by the projector, the processed target image information onto the projector screen comprises transmitting, by the MCU, the processed target image information to the image display unit and projecting, by the image display unit, the processed target image information onto the projector screen.

9. The method according to claim 8, wherein the video input unit is a camera.

10. The method according to claim 8, wherein the target image information is an image or a video pre-stored in the processing module.

11. The method according to claim 7, wherein the light emitting unit is a light emitting diode (LED).

12. The method according to claim 11, wherein the target image information is an image or a video pre-stored in the processing module.

13. The method according to claim 7, wherein the target image information is an image or a video pre-stored in the processing module.

14. A touch screen projection displaying method comprising:
  transmitting, to a processing module, touch position information generated by a touch operation via a touch area;
  processing, by a projector, target image information received from the processing module, and projecting, by the projector, processed target image information onto a projector screen;
  determining, by the projector, a boundary of the touch area according to a light signal generated by a light emitting unit disposed on an edge of the touch area of the projector screen;
  determining, by the projector, a boundary of a display area according to the luminance of image information currently displayed on a projector screen, wherein the display area is configured to display the processed target image information; and
  transmitting, by the projector, boundary information of the touch area and boundary information of the display area to the processing module to allow the processing module to determine the target image information according to the boundary information of the touch area, the boundary information of the display area and the touch position information.

15. The method according to claim 14, wherein the projector comprises a video input unit, a microcontroller unit (MCU) and an image display unit.

16. The method according to claim 15, wherein determining, by the projector, the boundary of the display area comprises acquiring, by the video input unit, the luminance of the image information currently displayed on the projector screen and determining, by the video input unit, the boundary of the display area according to the luminance of the image information currently displayed on the projector screen.

17. The method according to claim 16, wherein the video input unit is a camera.

18. The method according to claim 15, wherein processing, by the projector, the target image information comprises processing, by the MCU, the target image information to obtain information receivable by the image display unit.

19. The method according to claim 15, wherein transmitting, by the projector, the boundary information of the touch area and the boundary information of the display area comprises transmitting, by the video input unit, the boundary information of the touch area and the boundary information of the display area to the MCU and transmitting, by the MCU, the boundary information of the touch area and the boundary information of the display area to the processing module.

20. The method according to claim 14, wherein the target image information is an image or a video pre-stored in the processing module.

* * * * *